United States Patent
Fusco

(10) Patent No.: US 7,224,792 B2
(45) Date of Patent: May 29, 2007

(54) PERSONALIZED TELEPHONE ANNOUNCEMENT

(75) Inventor: Marc E. Fusco, Superior, CO (US)

(73) Assignee: Qwest Communications International, Inc., Denver, CO (US)

( * ) Notice: Subject to any disclaimer, the term of this patent is extended or adjusted under 35 U.S.C. 154(b) by 730 days.

(21) Appl. No.: 09/920,208

(22) Filed: Aug. 1, 2001

(65) Prior Publication Data

US 2003/0026416 A1 Feb. 6, 2003

(51) Int. Cl.
*H04M 1/00* (2006.01)

(52) U.S. Cl. .......................... 379/374.02; 379/373.01; 379/373.02; 379/373.03

(58) Field of Classification Search ................ 379/67.1, 379/68, 76, 82, 88.07, 88.12, 88.16, 88.21, 379/93.03, 100.13, 374.02, 373.04, 373.01, 379/372, 373.02, 373.03; 370/352, 356; 455/413, 462

See application file for complete search history.

(56) References Cited

U.S. PATENT DOCUMENTS

| | | | | |
|---|---|---|---|---|
| 5,999,599 | A * | 12/1999 | Shaffer et al. | 379/93.23 |
| 6,078,581 | A * | 6/2000 | Shtivelman et al. | 370/352 |
| 6,148,213 | A * | 11/2000 | Bertocci et al. | 455/462 |
| 6,373,925 | B1 * | 4/2002 | Guercio et al. | 379/82 |
| 6,466,653 | B1 * | 10/2002 | Hamrick et al. | 379/67.1 |
| 6,519,326 | B1 * | 2/2003 | Milewski et al. | 379/374.02 |
| 6,570,983 | B1 * | 5/2003 | Speeney et al. | 379/373.02 |
| 6,714,637 | B1 * | 3/2004 | Kredo | 379/142.08 |
| 6,728,354 | B1 * | 4/2004 | Fleck et al. | 379/373.02 |
| 7,031,453 | B1 * | 4/2006 | Busardo | 379/373.02 |
| 2002/0094076 | A1 * | 7/2002 | Chen | 379/373.01 |

* cited by examiner

*Primary Examiner*—Jefferey Harold
(74) *Attorney, Agent, or Firm*—Townsend and Townsend and Crew LLP

(57) ABSTRACT

According to the invention, a method for alerting a user of an incoming phone call is disclosed. In one step, notification of the incoming phone call is received with an identifier that is associated with the incoming phone call. The identifier associated with the incoming phone call is detected. The identifier is correlated with a pre-recorded voice announcement and the pre-recorded voice announcement is played.

14 Claims, 9 Drawing Sheets

PERSONALIZED TELEPHONE ANNOUNCEMENT

BACKGROUND OF THE INVENTION

This invention relates in general to telephone systems and, more specifically, to incoming call notification methods.

Current telephone service providers offer both call notification and call identification services if the existing telephone line is occupied. For call notification, one service offering uses a standard telephone to notify the terminating end that another caller is attempting to make a telephone connection by outputting an audible tone to a speaker or earpiece. For call identification, the service discloses the name and/or telephone number associated with the caller at the originating end. This visual notification is accomplished using telephone equipment that outputs alpha-numeric characters to a digital display. Related service offerings include customized ringing and/or the use of different audible tones when a caller is identified. Such offerings provide the terminating end with additional means to identify the originating end after a call notification has been received.

Other telephone services, such as Talking Call Waiting available from Qwest™, provide the terminating end with more notification and identification options to handle an incoming call. The Talking Call Waiting service provides the terminating end with a familiar call waiting tone then uses a voice to say the name of the incoming caller as determined by the Caller ID information. Talking Call Waiting service may use a separate device that works in conjunction with a telephone. Such a device can be incorporated into the telephone in newer telephones. There is a desire in the industry to improve notification services such that more detailed information about the originating end can help facilitate the decision to take the incoming call.

BRIEF DESCRIPTION OF THE DRAWINGS

The present invention is described in conjunction with the appended figures.

In the appended figures, similar components and/or features may have the same reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention plays personalized telephone announcements for a phone call received at a terminating end based upon identifier information for the incoming phone call. More specifically, the terminating end utilizes certain communication equipment that plays a personalized voice announcement correlated to the identity of the caller in advance of accepting an incoming telephone call. This is made possible by recording and digitizing a voice announcement for later playback. Then, any identifier information for the incoming call is correlated to a digitized announcement stored in a database. In other words, the terminating communication equipment uses a Caller I.D. function to identify of the originating end and plays any pre-recorded announcement that satisfies the criterion. The terminating end can use a single criterion or multiple criteria to play different pre-recorded announcements for the various identifiers that might come from the originating end.

Figure 1:
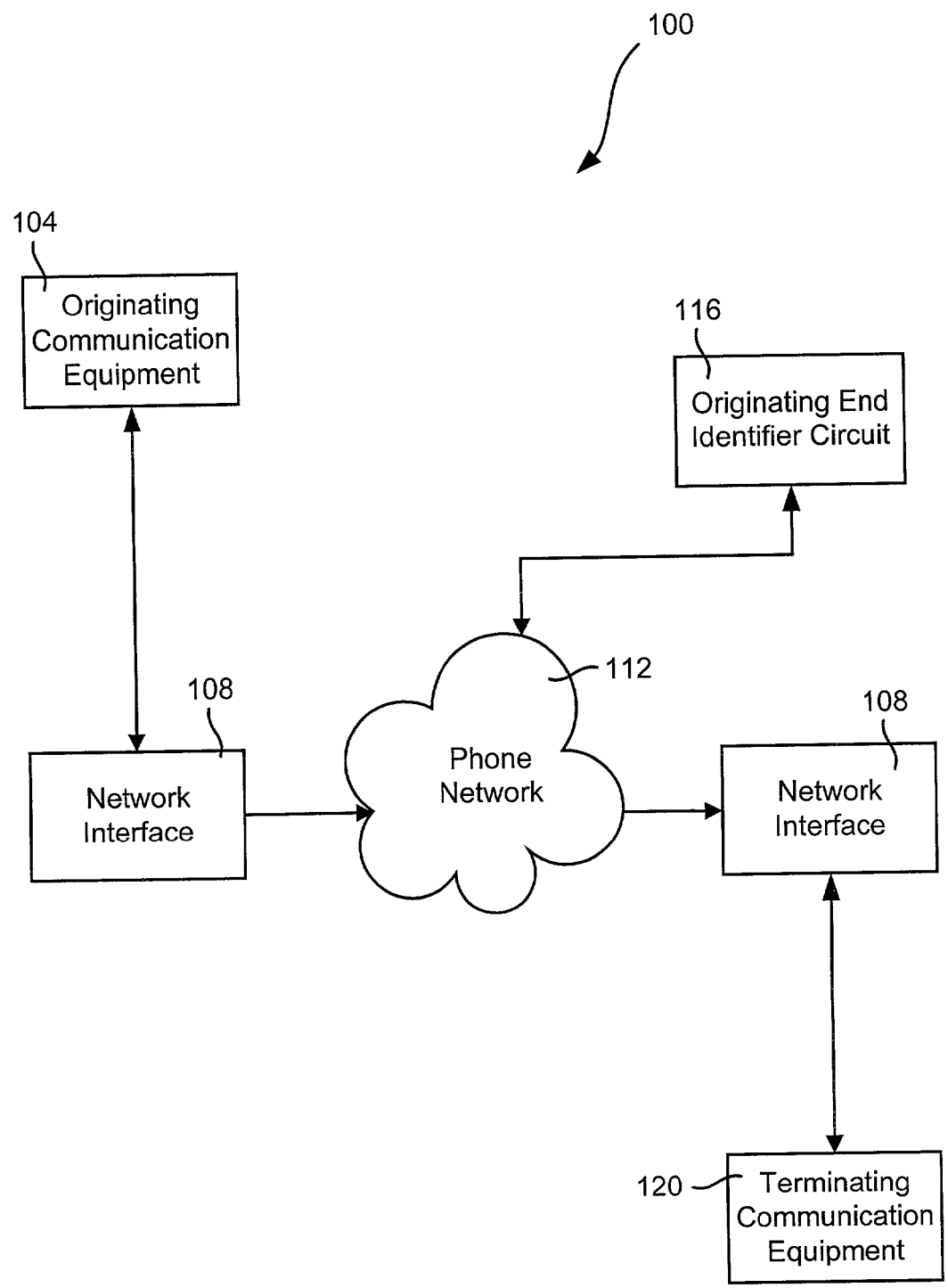
FIG. 1 is a block diagram of an embodiment of a telephone system that is used for personalized telephone announcements.

Referring to FIG. 1, a block diagram of an embodiment of a telephone system 100 that utilizes personalized telephone announcements is shown. In this embodiment, the telephone system 100 links originating communication equipment 104 to terminating communication equipment 120 through a phone network 112 using respective network interfaces 108. The originating communication equipment 104 is located at an originating end 104 and the terminating communication equipment 120 located at a terminating end 120.

The originating and terminating communication equipment 104, 120 can consist of at least one or more devices that are available for a communication exchange between the originating and terminating ends 104, 120. The originating communication equipment 104 can be a standard telephone, such as a pulse, a touch tone, an analog, a digital, a wireless, or a cordless telephone, or could be a personal computer with voice over Internet protocol (VOIP) capabilities.

The terminating communication equipment 120 can be any communication device(s) that can at least play a recorded announcement triggered by an incoming call satisfying a criterion. The terminating communication equipment 120 could include a telephone, such as a pulse, a touch tone, an analog, a digital, a wireless, or a cordless telephone, with certain enhancements discussed below or could be a personal computer with voice over Internet protocol (VOIP) capabilities with software to support the invention. The terminating communication equipment 120 has the ability to record, correlate and/or play personalized telephone announcements. Some embodiments of the terminating communication equipment 120 may utilize a standard telephone, such as an analog, pulse or touch tone telephone, in conjunction with a separate device that contains the technological components to record, correlate and/or play personalized telephone announcements.

The phone network 112 enables communications between the originating communication equipment 104 and terminating communication equipment 120. The phone network 112 can include such technologies as packet or circuit switching, UHF, carrier current, microwave, wireless, fiber optics, cable, and/or satellite communication. The network interfaces 108 are the points of interconnection between the communication equipment 104, 120 and the communications facilities of the telephone service provider. More specifically, one embodiment uses hard wiring to a telephone jack as the network interfaces 108 to connect the originating communication equipment 104 and terminating communication equipment 120 to the phone network 112. In an alternative embodiments, the network interfaces 108 may be different depending upon the communication technologies utilized by the originating and terminating ends 104, 120 (e.g. cellular or VOIP).

An originating end identifier circuit 116 is housed, for example, within a central office of a telephone service provider and associated with the phone network 112. This originating end identifier circuit 116 provides the terminating communication equipment 120 with signaling system 7 (SS7) identification or identifier information such as individual or company name and telephone number that is associated with the originating communication equipment 104 making the phone call. When a telephone call is placed from the originating communication equipment 104, the originating end identifier circuit 116 looks up the identifier information associated with the originating communication equipment 104, appends the identifier information to the telephone call of the originating end 104, then sends the combined information through the phone network 112 to the terminating end.

Figure 2:
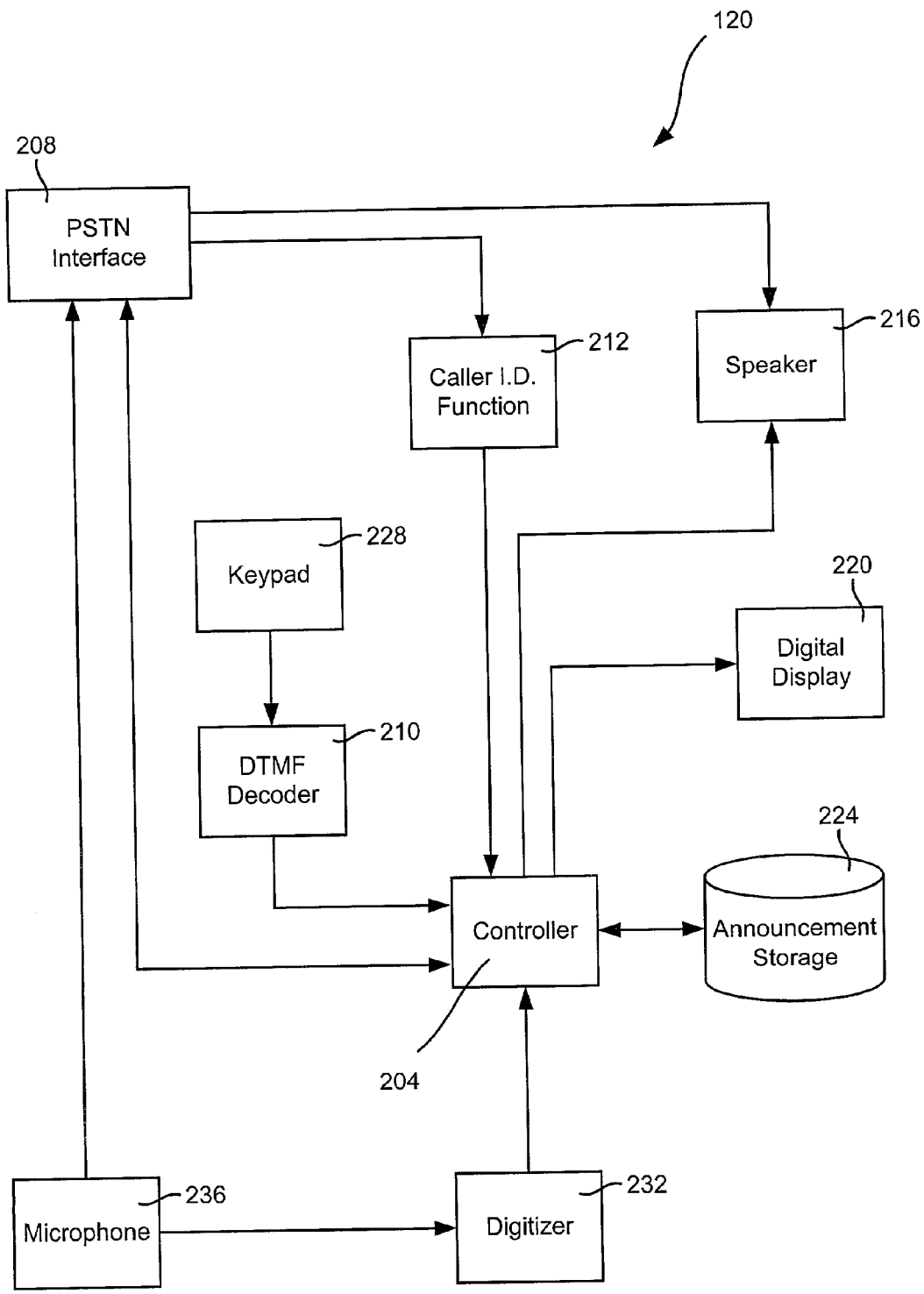
FIG. 2 is a block diagram of an embodiment of terminating communication equipment.

Referring to FIG. 2, a block diagram of an embodiment of terminating communication equipment 120 is shown. In this embodiment, the terminating communication equipment 120 is a smart telephone that can notify users of communication transmissions with a pre-recorded announcement correlated to the caller ID information. This smart telephone contains the technological components to record, correlate and/or play personalized telephone announcements. One such technological component is a caller I.D. function 212 that takes the identifier information (e.g. SS7) off the line, decodes it, and routes it through a controller 204 to a digital display 220 and/or uses the identifier information to check it against criteria stored in the announcement storage database 224. Another such component of the smart telephone is a DTMF decoder 210 which serves to recognize tone prompts that are input by a keypad 228 and interact with announcement storage capabilities.

The specific function of each technological component is managed by the controller 204 which includes a processor that runs firmware to manage the terminating communication equipment 120. The controller 204 interfaces with the caller I.D. function 212 to obtain the identifier information, correlates the identifier information to any pre-recorded voice announcements that satisfy the criteria, and retrieves the pre-recorded voice announcement when correlated.

In order to execute a communication exchange through the phone network 112, a PSTN (Public Switched Telephone Network) interface 208 is utilized. This PSTN interface 208 interacts with the controller 204 to detect the status of the phone line, such as ring, dial tone, open or occupied line, and make a telephone connection through the phone network 112. The PSTN interface 208 also performs other phone functions including accepting input from a microphone 236 or mouthpiece and outputting the originator's voice to a speaker 216, whereby the speaker 216 could be the hands-free speaker or an earpiece.

The input of personalized telephone announcements from the microphone 236 to the controller 204 occurs by the use of a digitizer 232 which converts the analog signal to a digital signal. After the digitizer 232 converts the input to a digitized recording, the personalized telephone announcement is stored to an announcement storage database 224. Although this embodiment stores a digitized recording some embodiments could store the recording in analog form.

The announcement storage database 224 is a database that stores and correlates personalized telephone announcements with an associated incoming call to the terminating communication equipment 120 that satisfies a criterion. All possible criterion and their corresponding recorded announcements are stored in the database 224. Such correlation can relate to identifier (e.g. caller) identification or other SS7 information including contact name (in whole or part), phone number (in whole or part), status and/or features of the originating communication equipment 104, and number accessibility (e.g. unlisted number or blocked caller). The announcement storage database 224 could also include other pertinent and/or classification information about the originating end 104 as deemed important by the terminating end 120, which would be entered and stored in separate database fields for correlation with an incoming call.

Figure 3:
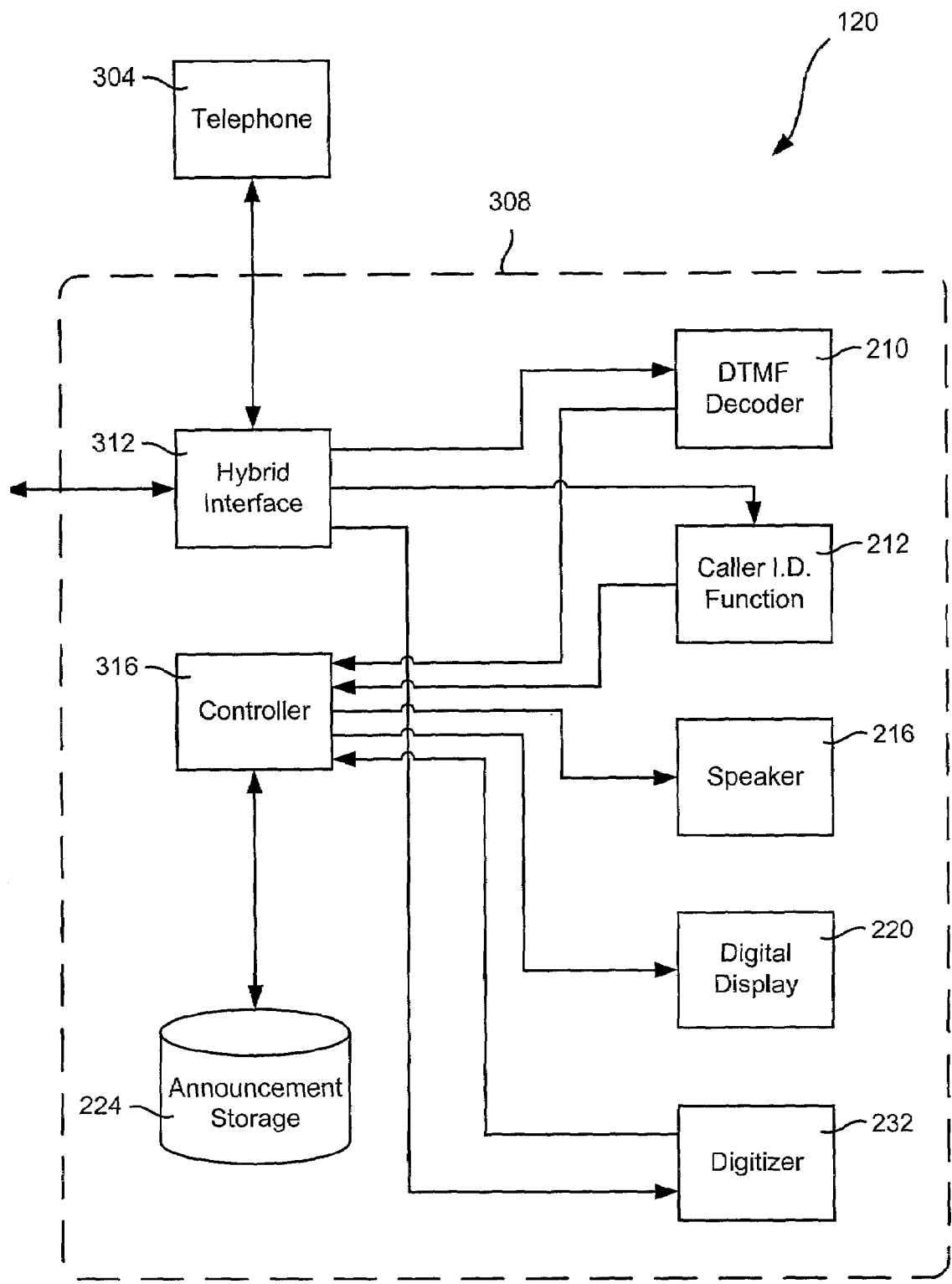
FIG. 3 is a block diagram of another embodiment of terminating communication equipment.

Referring to FIG. 3, a block diagram of another embodiment of terminating communication equipment 120 is shown. In this embodiment, the terminating communication equipment 120 is the combination of a telephone 304 and a separate device 308. Although the terminating communication equipment 120 includes a standard telephone, the telephone 304 can be of any type including pulse, touch tone, analog, digital, wireless, cordless and/or smart telephone. More specifically, this embodiment is designed for use with those types of telephones 304 which do not necessarily have the functional capabilities of the separate device 308.

The separate device 308 contains the hybrid interface 312, a controller 316, the DTMF decoder 210, the caller I.D. function 212, the speaker 216, the digital display 220, the digitizer 232, and the announcement storage database 224. In terms of the methods available for inputting and recording information, this embodiment utilizes the keypad and microphone functions that already exist in the telephone 304. Conversely, these items could be added to the separate device 308 in another embodiment.

The hybrid interface 312 is the interface between the telephone 304, the phone network 112, and the separate device 308. Similar to the PTSN interface 208, the hybrid interface 312 detects the status of the phone line, such as ring, dial tone, open or occupied line, and completes the connection of the telephone 304 to the phone network 112 using a pass through circuit to the network interface 108. Identifier information (e.g. SS7 and numerical tones) is pulled off the line using the caller I.D. function 212.

The controller 316, located within the separate device 308, accepts input from the caller I.D. function 212, the digitizer 232, and the announcement storage database 224 for the correlation of personalized telephone announcements. Additional input to the controller 316 occurs by routing the voice input from the telephone 304 through the hybrid interface 312 and the digitizer 232 to convert the signal from analog to digital. Still further input to the controller 316 occurs by routing keyed input from the keypad 228 of the telephone 304 through the DTMF decoder 210 which provides a way for the user to interact with the separate device 308. Output from the controller 316 can be routed to the speaker 216, the digital display 220 and/or the announcement storage database 224.

Figure 4:
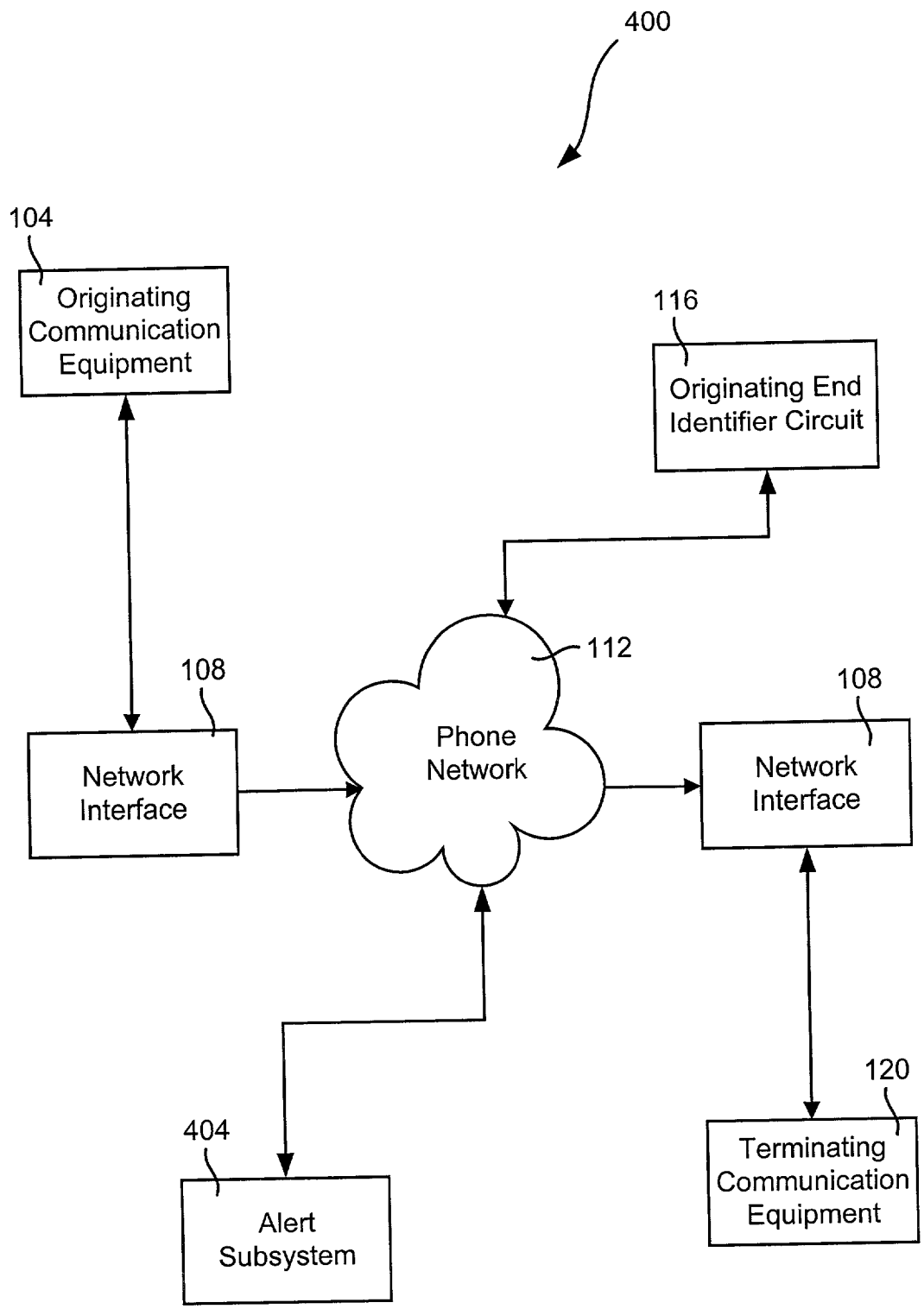
FIG. 4 is a block diagram of another embodiment of a telephone system that uses an alert subsystem to personalize telephone announcements.

Referring to FIG. 4, a block diagram of another embodiment of a telephone system 400 is shown that uses an alert subsystem 404 to provide personalized telephone announcements. In this embodiment, the originating and terminating communication equipment 104, 120 are connected to the phone network 112 using network interfaces 108 as was described in relation to FIG. 1. Similarly, the originating end identifier circuit 116 is connected to the phone network 112 and performs the same function as described previously. The change associated with this embodiment lies in the addition of the alert subsystem 404 that contains the capability to correlate incoming calls based upon criteria, store personalized telephone announcements in a database and send personalized telephone announcements to the terminating communication equipment 120.

The alert subsystem 404 is a communication system located off the phone network 112 and provides the terminating end 120 with the ability to record a personalized telephone announcement by speaking into the mouthpiece of a standard telephone as well as the ability to select, assign, attach, edit and/or delete criterion associated with the personalized telephone announcement using the keypad of the same telephone. Also, the alert subsystem 404 can be accessed using a personal computer such that the recording of personalized telephone announcements and the interaction with criterion can occur remotely from the terminating end 120. Regardless of the type of communication equipment used for system access, the alert subsystem 404 is an independent, stand-alone system that accepts input from external users and retrieves correlated information from an announcement storage database 224 in order to play personalized announcements when a phone call is received at the terminal end.

In one embodiment, the alert subsystem 404 is functional with a rotary or touch tone telephone as the terminating communication equipment 120. The terminating communication equipment 120 can be used for the recording or retrieval of personalized telephone announcements stored in the alert subsystem 404.

Personalized telephone announcements and correlation criterion can be entered into the alert subsystem 404 using a microphone 236, keypad 228, or the keyboard of a personal computer. Prior to storage within the announcement storage database 224, voice or analog input is converted to digital input using a digitizer 232 and keyed entries may utilize a DTMF decoder 210 to recognize the keypad tones. Also, caller ID information (e.g. name and phone number) is received through the caller ID function 212 which can be used as correlating criterion by the announcement storage database 224. Further, additional criterion used for correlation can be inputted and stored separately by another source such as an employee of the company that offers the service.

When a telephone call is initiated from the originating end 104, Caller ID information is attached by the originating end identifier circuit 116. Also, the alert subsystem 404 is accessed to determine if any personalized telephone announcements match the criterion specified by the termination end 120. If a match occurs, the personalized telephone announcement is retrieved from the announcement storage database 224 for playback by a speaker 216 or earpiece at the terminating end 120.

Figure 5:
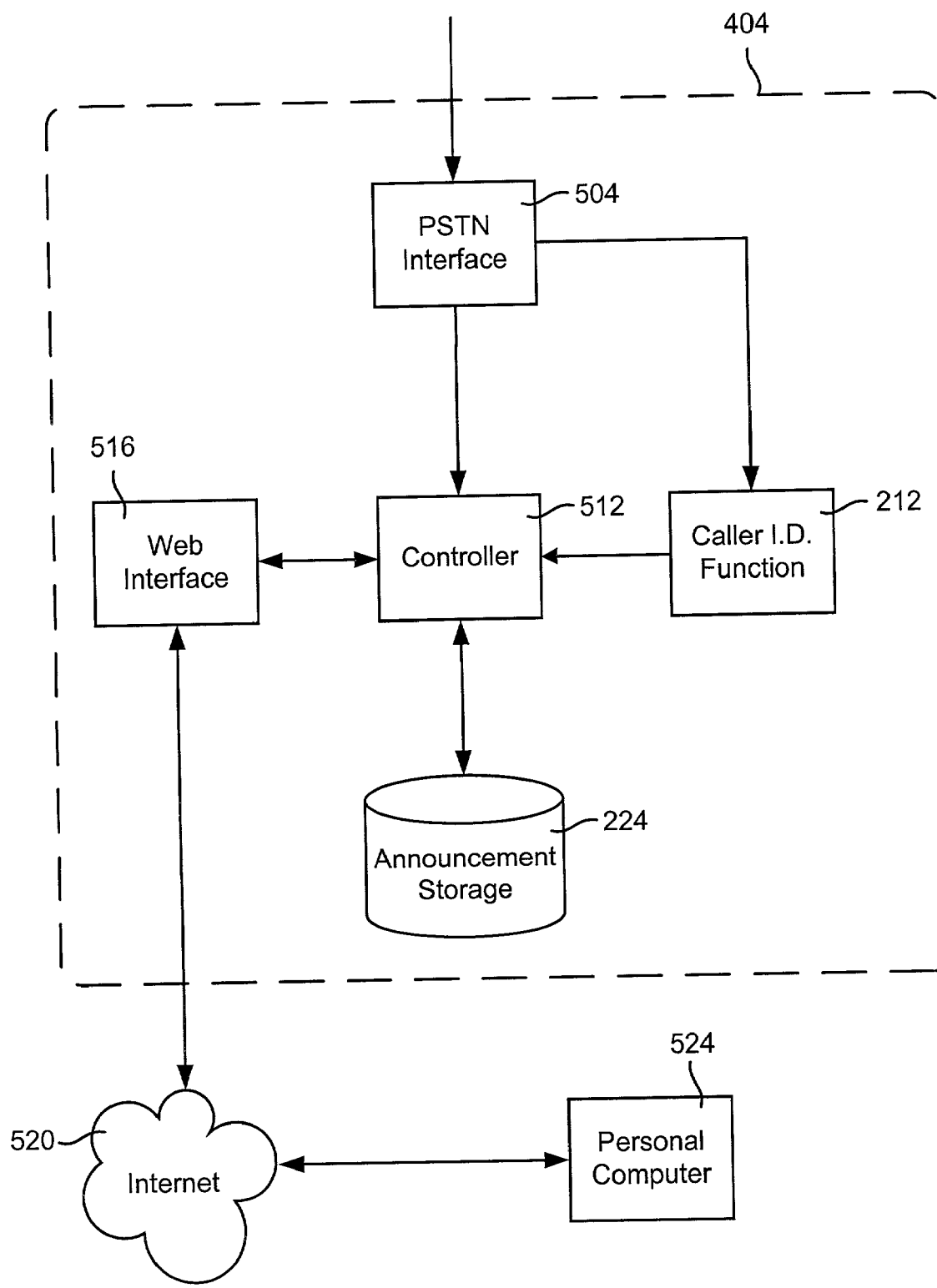
FIG. 5 is a block diagram of an embodiment of an alert subsystem for a personalized telephone announcement system that is accessed using a web interface.

Referring to FIG. 5, a block diagram of an embodiment of an alert subsystem 404 for a telephone system 400 accessed using a web interface 516 is shown. In this embodiment, the alert subsystem 404 receives input from a personal computer 524 which accesses a web interface 516 (e.g. a web page) through the Internet 520, whereby both the Internet 520 and the personal computer 524 lie external to the alert subsystem 404.

The internal elements of the alert subsystem 404 are a PSTN interface 504, a controller 512, the caller I.D. function 212, a web interface 516 and the announcement storage database 224. The PSTN interface 504 is the circuit that creates the connection between the alert subsystem 404 and the phone network 112. The web interface 516 simplifies the user interface by allowing personal computer 524 to interface with the alert subsystem 404 using a web browser, for example. Both the announcement storage database 224 and the caller I.D. function 212 operate as described in relation to the other figures.

The functions of the controller 512 vary depending upon whether it is in a configuration or operation mode. In the configuration mode, the controller 512 manages information whereby it accepts correlation criteria input from the web interface 516, gets digitized sound from the personal computer 524, and stores personalized telephone announcements in the announcement storage database 224. The process of recording, storing, and correlating a personalized telephone announcement into the announcement storage database 224 is executed by pulling up a web page associated with the web interface 516 on the display monitor on the personal computer 524. This web page accepts such input by using the keyboard, microphone, digitizing functions, and other processing capabilities of the personal computer 524. The process of establishing the criterion and correlating a personalized telephone announcement to the criterion occurs through the sequencing of one or more associated web pages associated with the web interface 516. In addition, the alert subsystem 404 stores the announcement and criteria in the announcement storage database 224.

In the operation mode, the alert subsystem 404 processes identifier information against the criteria to find any qualifying announcements. Qualifying announcements are passed to an enhanced telephone that plays the announcement on a speaker and/or in an earpiece if the line is currently occupied.

Figure 6:
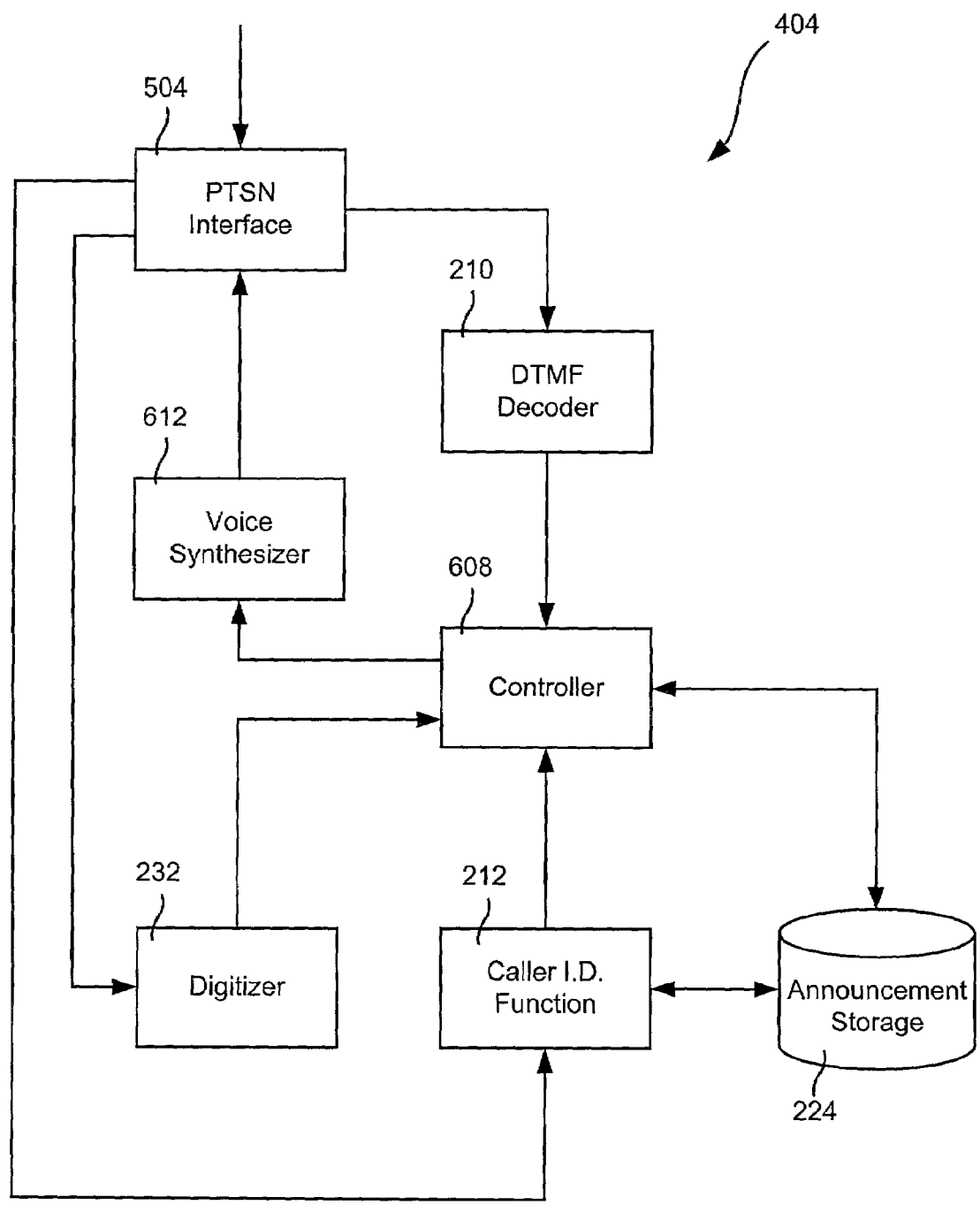
FIG. 6 is a block diagram of an embodiment of an alert subsystem for a personalized telephone announcement system that is accessed using a telephone.

Referring to FIG. 6, a block diagram of another embodiment of an alert subsystem 404 for a telephone system 400 that also uses the enhanced telephone is shown. For this embodiment, the enhanced telephone is used to record personalized telephone announcements and enter criteria in the configuration mode. The method of entry could include calling into the service to record voice announcements using the telephone; entering and assigning the criteria for the recorded announcements using the touch tone keypad; interacting with interacting with the recorded announcement capabilities; and/or adding, modifying or deleting recordings. Voice prompts are used to solicit input from the touch tone keypad of the enhanced telephone.

The PSTN interface 504 receives an incoming call from the phone network 112 whereby the caller I.D. function 212 pulls the appropriate information off the line furnished by the originating end identifier circuit 116, a DTMF decoder 210 recognizes the tone prompts, and the digitizer 232 converts the voice signal from analog to digital. The result of each of these steps is channeled through a controller 608. Although this embodiment uses a DTMF decoder 210 to receive input from the terminal end, other embodiments could use voice recognition functions within the controller 608 to interpret digitized voice so as to allow entering criteria.

In the configuration mode, the controller 608 may solicit information enunciated by a voice synthesizer 612 whereby the resulting response is routed back through the PTSN interface 504, the digitizer 232, and/or a DTMF decoder 210 before returning to the controller 608.

In the operation mode, this controller 608 is responsible for processing identifier information, correlating the identifier information with the pre-recorded voice announcement, and retrieving the pre-recorded voice announcement when correlated. The retrieved announcements are sent through the PTSN interface 504 to the enhanced telephone for playing.

Figure 7:
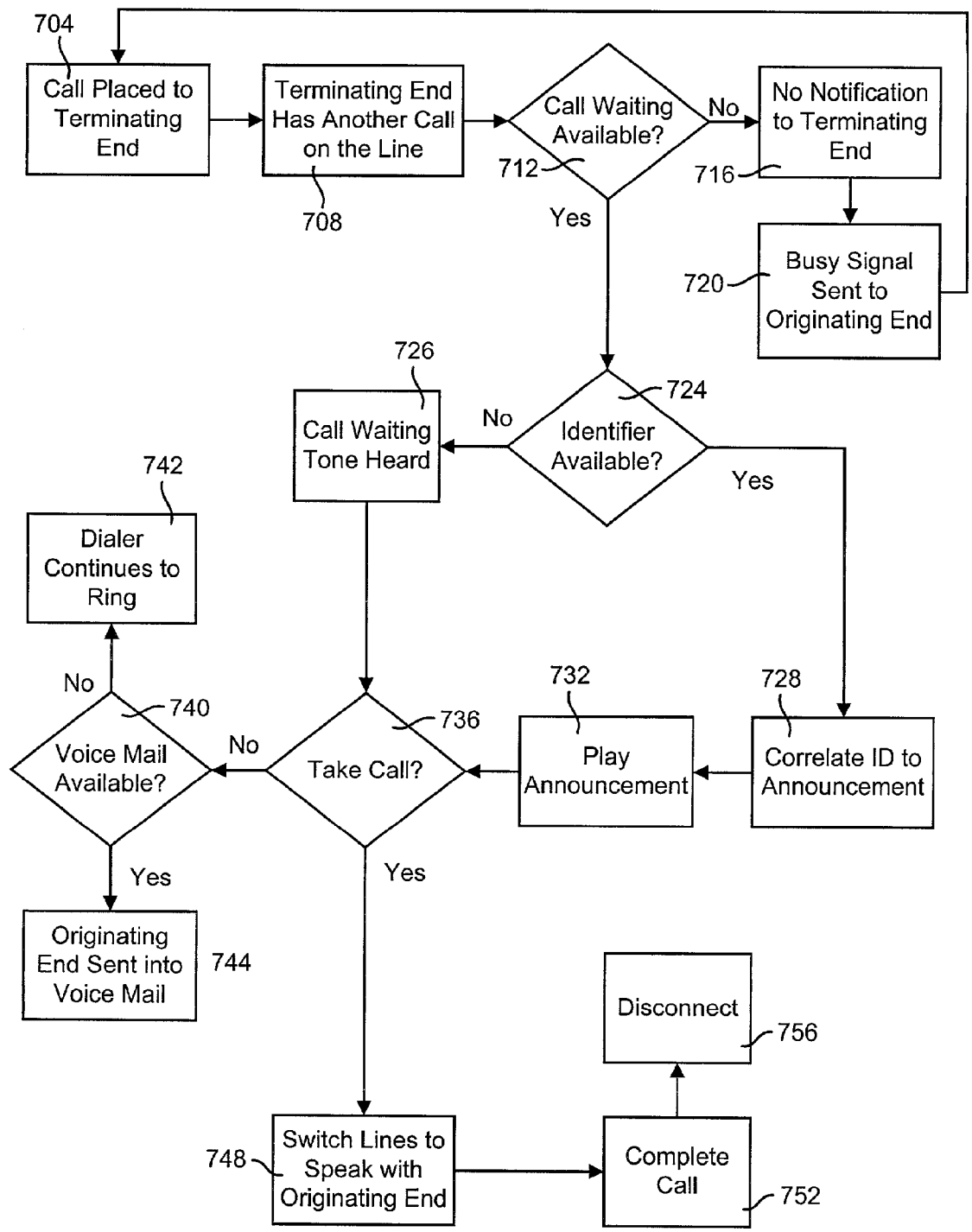
FIG. 7 is a flow diagram of an embodiment of a process for receiving and correlating personalized telephone announcements.

FIG. 7 is a flow diagram of an embodiment of a process for correlating and playing personalized telephone announcements. The particular embodiment used for the explanation of this flow diagram is found in FIG. 6. The terminating end 120 uses an enhanced telephone in conjunction with access to several other telephone services made available off the network 112 such as options for call waiting, voice mail, and personalized telephone announcements.

In step 704 of this example, a call is placed to the terminating end 120 and in step 708 it is determined that the terminating end 120 has another call on the line. At this point, it is determined if the terminating end 120 has the call waiting service available in step 712. If the service is not available, no notification is given to the terminating end 120 in step 716 and a busy signal is sent to the originating end 104 in step 720. The terminating end 120 then has the option to disconnect or repeat the process by returning to step 704 and placing a new call at another time.

If the call waiting service is available in step 712, it is determined if the alert subsystem 404 has received any identifier matching criteria in step 724. If no identifier is available, the terminating end 120 hears a call waiting tone through the earpiece or speaker of the telephone and has the option to take the other call in step 736. If an identifier is available in step 724, the announcement storage database 224 is accessed in step 728 retrieve the criteria for the terminating end 120. The identifier information is tested against all criteria. If the identifier information passes any criteria, the corresponding announcement(s) is played in step 732.

There are several ways to define criteria for personalized telephone announcements. One criterion could attach an announcement such as "unknown caller" to all telephone calls received by an originating end 104 whose identity (e.g. name or phone number) is not disclosed by the caller I.D. function 212. Other criterion include recognizing family members based on a known phone numbers, identifying long distance based on variations from the local area code, rating callers based on the frequency of repeat calls, and assigning messages that correspond to a code number for medical or emergency situations. Once the criterion is satisfied a recorded message appropriate to that situation could be played.

When the announcement is played in step 732, the terminating end 120 can listen to the announcement that identifies the originating end 104 and has the option to take the other call in step 736. If the user at the terminating end 120 decides not to take the call in step 736, it is determined if the terminating end 120 has the voice mail service in step 740. If voice mail is not available in step 740, the caller at the originating end 104 will continue to hear the dialer ring in step 742 until the choice is made to disconnect the line. If voice mail is available in step 740, the originating end 104 is sent to voice mail in step 744 and has the option to leave voice mail before disconnecting the line.

Unlike hearing a call waiting tone in step 726, playing a personalized telephone announcement in step 732 gives the terminating end 120 more information to decide if the call should be taken in step 736. If the announcement helps the terminating end 120 decide to take the call based upon receiving a personalized telephone announcement, the telephone lines can be switched in step 748 with the pressing of a flash key on the telephone keypad or momentarily hanging up the telephone as is well known in the art. Step 752 follows, whereby the parties complete the telephone call. At this point, the line is disconnected in step 756.

Figure 8:
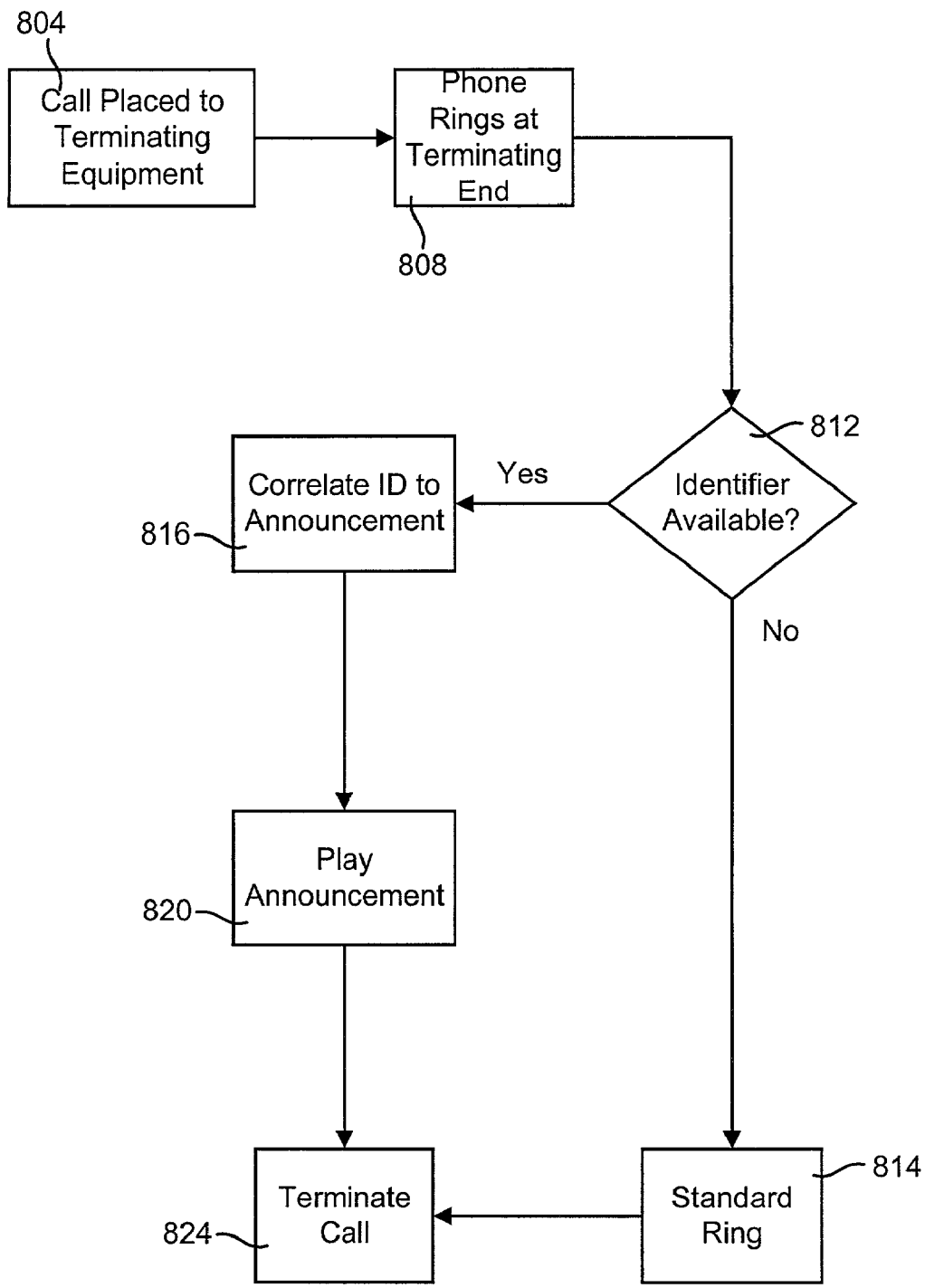
FIG. 8 is flow diagram of another embodiment of a process for receiving and correlating personalized telephone announcements.

Referring next to FIG. 8, another flow diagram of an embodiment of a process for receiving and correlating personalized telephone announcements is shown. In this embodiment, the hardware of FIG. 6 is once again utilized, but those skilled in the art can realize the other embodiments can be used as well. Unlike the process of FIG. 7, the terminating end 120 in this embodiment is not using the telephone line and is unavailable in step 808 to take the call from the originating end 104 in step 804.

This flow diagram reveals that the same process of seeking an available identifier takes place in step 812 regardless of whether the terminating end 120 is available to answer the call. In step 804, a call is placed from the originating end 104 to the terminating end 120. The phone begins to ring at the terminating end 120 in step 808. If an identifier is not available in step 812, a telephone will continue to ring in step 814 until the originating end 104 chooses to terminate the call in step 824.

Alternatively, the personalized announcement database 224 is accessed to retrieve a correlated announcement in step 81 if an identifier is available in step 812, regardless of the fact that the user at the terminating end 120 is unavailable. The announcement is played in step 820 in the form of a voiced announcement on the hands-free speaker 216 and/or, possibly, the appearance of the text equivalent of the announcement on the digital display 220. Again, the originating end 104 can continue to let the telephone ring or decide to terminate the unanswered call in step 824.

Figure 9:
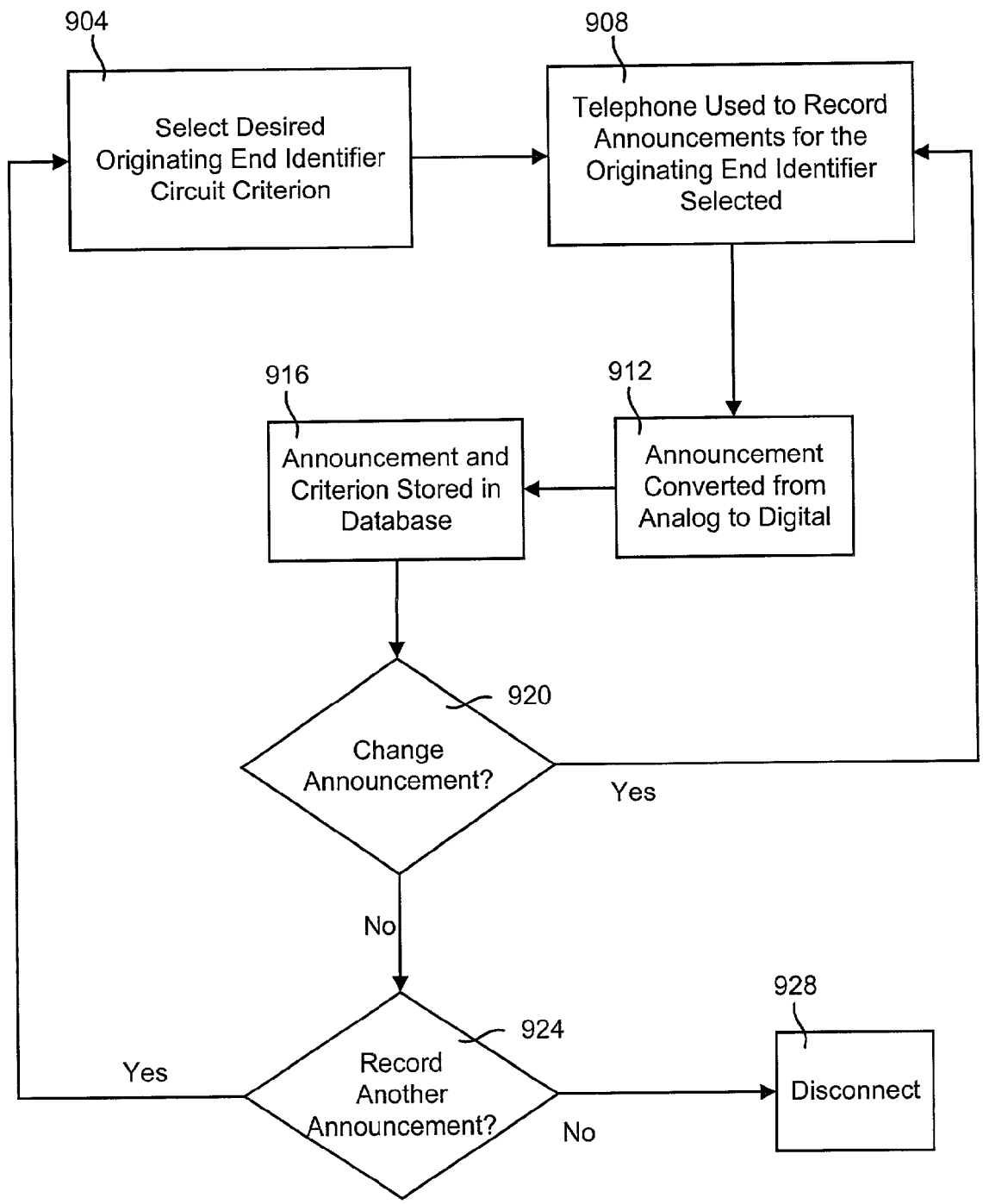
FIG. 9 is a flow diagram of an embodiment of a process for recording and storing personalized telephone announcements.

FIG. 9 is a flow diagram of an embodiment of a process for recording and storing personalized telephone announcements along with an associated criterion. In step 904, the terminating end 120 has the ability to enter or select a desired criterion to identify a possible originating end 104. Using the hardware of FIG. 6 as an example, the user associated with the terminating end 120 calls into the alert subsystem 404 to interact with voice prompts to enter the criterion. Such criterion can relate to caller identification or SS7 information including contact name (in whole or part), phone number (in whole or part), status and/or features of the communication equipment, and number accessibility (e.g. unlisted number or blocked caller). In various embodiments, the identifier information can be entered using the telephone keypad 228, voice recognition, and/or using the keyboard of a personal computer 524.

Step 908 uses an enhanced telephone at the terminating end 120 to record the personalized telephone announcements corresponding to the criterion specified in step 904. This step 908 can be as simple as speaking into the telephone to record an appropriate announcement for the criterion entered in step 904. The announcement is converted from an analog to a digital signal in step 912 through the use of a digitizer 232 in the alert subsystem 404. Step 916 follows whereby the announcement and the identifier criterion are stored in the announcement storage database 224 for future retrieval. After step 916 completes the announcement and criterion is ready for correlation with the next incoming call.

Step 920 provides the terminating end 120 with the option to change an announcement that has been entered into the system. If a change is desired in step 920, the process returns to step 908 whereby a new recording can be made to replace the current announcement. If there is no desire to change a recorded announcement, the terminating end 120 has the option to enter another criterion and record another announcement, the process returns to the beginning step 904. If the terminating end 120 decides not to record another announcement in step 924, step 928 occurs with a disconnection from the alert subsystem 404.

A number of variations and modifications of the invention can also be used. For example, one variation of the invention is to output the stored content of the pre-recorded voice announcements to a digital display 220. This output, similar to the alpha numeric display on a pager device, could be made possible through the use of a computer chip or software program that converts the pre-recorded speech to digitized text. The result of such a conversion may enhance the service offering for individuals with hearing-impairments who would benefit from having a visual-based system for the identification of the originating party.

In light of the above description, a number of advantages of the present invention are readily apparent. For example, the playing of a personalized telephone announcement gives the terminating end 120 more information about the originating end 104 in advance of taking the telephone call. A pre-recorded announcement makes it easier for the terminating end 120 to decide if the telephone should be answered. The invention allows personalized announcements regardless of whether the phone line for the terminating end 120 is currently being used or not.

While the principles of the invention have been described above in connection with specific apparatuses and methods, it is to be clearly understood that this description is made only by way of example and not as limitation on the scope of the invention.

What is claimed is:

1. A method for alerting a user at a terminal location of an incoming phone call, the method comprising steps of:
   receiving a criterion manually entered by the user before the incoming phone call is placed;
   receiving notification of the incoming phone call with an identifier associated with the incoming phone call;
   detecting the identifier associated with the incoming phone call;
   correlating the identifier with a pre-recorded voice announcement using the criterion;
   converting the pre-recorded voice announcement to digitized text;
   receiving the pre-recorded voice announcement and the digitized text from a point geographically separate from the terminal location; and
   interrupting a phone call to play the pre-recorded voice announcement through an earpiece at the terminal location and concurrently display the digitized text at the terminal location.

2. The method for alerting the user of the incoming phone call as recited in claim 1, wherein the step of correlating the identifier comprises at least one of the following steps:
   correlating a phone number with a pre-recorded voice announcement;
   correlating a portion of the phone number with a pre-recorded voice announcement; and
   correlating a caller ID name with a pre-recorded voice announcement.

3. The method for alerting the user of the incoming phone call as recited in claim 1, further comprising a step of:
   recording the pre-recorded voice announcement.

4. The method for alerting the user of the incoming phone call as recited in claim 3, further comprising a step of storing the pre-recorded voice announcement with consumer phone equipment.

5. A computer-readable medium having computer-executable instructions for alerting the user of the incoming phone call as recited in claim 1.

6. The method of claim 1, wherein the criterion manually entered by the user is received via a web interface.

7. The method for alerting the user of the incoming phone call as recited in claim 1, further comprising a step of:
   determining whether to interrupt the phone call based at least in part on criteria associated with frequency of repeat calls associated with the correlated identifier.

8. A method for alerting a user of telephone equipment of an incoming phone call, the method comprising steps of:
   recording a voice announcement to create a pre-recorded voice announcement, wherein the recording occurs at a point geographically separate from the terminal location;
   receiving a selection that helps correlate the pre-recorded voice announcement to an identifier, wherein the selection is manually entered by the user prior to the incoming phone call;
   receiving notification of the incoming phone call that indicates the identifier associated with the incoming phone call;
   detecting the identifier associated with the incoming phone call;
   correlating the identifier with the pre-recorded voice announcement using the selection;
   converting the pre-recorded voice announcement to digitized text;
   receiving the pre-recorded voice announcement and digitized text from the point geographically separate from the terminal location;
   displaying the digitized text at the terminal location; and
   playing the pre-recorded voice announcement with a speaker separate from an earpiece, wherein the pre-recorded voice announcement is played when the telephone equipment is not engaged in an ongoing phone call.

9. The method for alerting the user of the incoming phone call as recited in claim 8, wherein the step of correlating the identifier comprises at least one of the following steps:
   correlating a phone number with the pre-recorded voice announcement;
   correlating a portion of the phone number with the pre-recorded voice announcement; and
   correlating a caller ID name with the pre-recorded voice announcement.

10. The method for alerting the user of the incoming phone call as recited in claim 8, further comprising a step of storing the pre-recorded voice announcement with consumer phone equipment.

11. The method for alerting the user of the incoming phone call as recited in claim 8, further comprising a step of interrupting a phone call to play the pre-recorded voice announcement.

12. A computer-readable medium having computer-executable instructions for alerting the user of the incoming phone call as recited in claim 8.

13. An alert subsystem geographically remote from a terminal location for announcing phone calls with a pre-recorded voice announcement, the subsystem comprising:
- an announcement storage database storing the pre-recorded voice announcement;
- a recorder to record the pre-recorded voice announcement;
- a converter to convert the pre-recorded announcement to digitized text;
- a caller ID function that detects an identifier associated with an incoming phone call;
- a correlator that associates the identifier with the pre-recorded voice announcement; and
- an interface that transmits the pre-recorded voice announcement and the digitized text to the terminal location after the pre-recorded voice announcement is correlated to the identifier.

14. The alert subsystem for announcing phone calls with a pre-recorded voice announcement as recited in claim 13, further comprising a web interface for receiving at least one of a criterion and a voice announcement.

* * * * *

UNITED STATES PATENT AND TRADEMARK OFFICE
CERTIFICATE OF CORRECTION

PATENT NO.         : 7,224,792 B2
APPLICATION NO.    : 09/920208
DATED              : May 29, 2007
INVENTOR(S)        : Marc E. Fusco It is certified that error appears in the above-identified patent and that said Letters Patent is hereby corrected as shown below:

At column 10, line 45, please delete the first word "disp1aying" and replace with --displaying--.

Signed and Sealed this

Eighth Day of April, 2008

JON W. DUDAS
*Director of the United States Patent and Trademark Office*